(12) United States Patent
Wiplinger

(10) Patent No.: US 6,927,702 B2
(45) Date of Patent: Aug. 9, 2005

(54) LANDING GEAR WARNING SYSTEM

(76) Inventor: Robert D. Wiplinger, c/o Wipaire, 1700 Henry Ave., Fleming Field, South St. Paul, MN (US) 55075

( * ) Notice: Subject to any disclaimer, the term of this patent is extended or adjusted under 35 U.S.C. 154(b) by 0 days.

(21) Appl. No.: 10/167,047

(22) Filed: Jun. 11, 2002

(65) Prior Publication Data

US 2003/0011493 A1 Jan. 16, 2003

Related U.S. Application Data

(60) Provisional application No. 60/297,357, filed on Jun. 11, 2001.

(51) Int. Cl.$^7$ ............................................. G08B 21/00
(52) U.S. Cl. ................... 340/960; 340/963; 340/970; 356/5.01
(58) Field of Search ..................... 340/960, 945, 340/963, 970; 73/178 T; 356/2, 600, 601, 5.01; 342/33, 34, 35; 348/144, 145, 146, 147

(56) References Cited

U.S. PATENT DOCUMENTS

| | | | |
|---|---|---|---|
| 4,516,124 A | 5/1985 | Shannon et al. ............ 340/960 |
| 4,923,145 A | 5/1990 | Boardhurst ................. 244/100 |
| 4,925,303 A | 5/1990 | Pusic ......................... 356/152 |
| 5,047,779 A | * 9/1991 | Hager ......................... 342/120 |
| 5,113,346 A | 5/1992 | Orgun et al. ............... 364/428 |
| 5,557,397 A | * 9/1996 | Hyde et al. ................. 356/5.01 |
| 5,745,053 A | 4/1998 | Fleming, III ................ 340/970 |
| 6,008,742 A | 12/1999 | Groves ........................ 340/960 |
| 6,012,001 A | 1/2000 | Scully ......................... 701/16 |
| 6,157,891 A | 12/2000 | Lin ............................. 701/301 |
| 6,267,039 B1 | * 7/2001 | Czarnecki .................... 89/1.11 |
| 6,304,800 B1 | 10/2001 | Ishihara et al. ............... 701/16 |

\* cited by examiner

*Primary Examiner*—Anh V. La
(74) *Attorney, Agent, or Firm*—Fredrikson & Byron, P.A.

(57) ABSTRACT

The present invention provides for a computer that accepts inputs from a surface monitor to determine whether the terrain below the aircraft is water or land. In a preferred embodiment an improved landing gear warning system is provided to warn a pilot when landing gear of an aircraft are in the improper configuration for a landing on a particular surface. The warning system comprises a computer operatively connected to a surface monitor and a gear-status warning indicator. The computer also accepts an input from the gear status sensors to determine if the landing gear is extended or retracted. If the system senses a water surface and the landing gear is down, a warning light and/or buzzer alerts the pilot that the landing gear is in the incorrect configuration. If the landing surface is land and the gear is up, the "gear status" indicator warning is initiated.

20 Claims, 3 Drawing Sheets

LANDING GEAR WARNING SYSTEM

This application claims benefit of priority of U.S. provisional patent application 60/297,357 filed Jun. 11, 2001 the contents of which are herein expressly incorporated by reference.

FIELD OF THE INVENTION

The present invention relates generally to surface conditions detections and warning systems for use in aircraft.

BACKGROUND

A great number of aircraft landing accidents are associated with improper landing gear configuration during landing. For example, one of the largest sources of insurance claims for retractable gear aircraft is gear up landings when an aircraft lands on a runway with the landing gear retracted, causing the aircraft to contact the ground initially with its belly, propeller(s), engine(s), and wing(s). Even if the landing is successfully completed, and injury or loss of life is avoided, the accident naturally results in extensive damage to the aircraft. Another type of landing gear status accident may involve amphibians landing on water. Amphibians are typically equipped to land on water or land, and thus have landing gear that can be extended below the aircraft's pontoon structures, or "floats". However, if the landing gear is extended when a amphibian is landing on water, the aircraft will typically flip forward into the water upon the landing gear's impact with the water, potentially resulting in damage to the aircraft and injury to the crew and passengers. While amphibian pilots may be particularly susceptible to committing gear status errors, due to the difference in the proper gear status for any landing surfaces, any pilot may be subject to this lapse.

Prior landing gear warning systems typically rely on outside variables such as flap position and/or throttle speed. However, experience has shown that it is very easy for the pilot to operate the aircraft in a manner that renders these systems ineffective. Various situations and circumstances may cause a pilot to attempt a landing while these variables are not in the typical configuration for landing. For example, using a high throttle speed when landing, such as under gusty conditions or when approaching at high speed, can leave the pilot unprotected. Since the aircraft variable is not in the typical landing state, no gear warning is issued, and the error is not brought to the pilot's attention. In addition, false warnings can be initiated when the pilot is not trying to land. Improper landing gear configurations generally happen when distractions occur in the cockpit. Further, the use of headsets has made it more difficult to hear and recognize the cockpit warnings. There have also been many instances of pilots misinterpreting the gear warning horn, or ignoring it completely, resulting in improper gear configuration during landing. It would be desirable to provide a gear status-warning indicator based on variables that are highly, if not completely, correlated with the typical landing protocol.

Previous systems have tried to provide gear status-warning indicators based on variables correlating with typical landing protocol. U.S. Pat. No. 4,516,124 describes a pilot warning system for amphibious aircraft with retractable landing gear which includes a prompting device for warning the pilot that the aircraft is in transition between a landing speed and a cruising speed. The pilot must then take action and press a button indicating, prior to landing, whether the landing is to be on land or on water. An indicator tells the pilot if the retractable landing gear is in a position corresponding to the designated landing surface. If a water landing is proposed and the landing gear is retracted, operations proceed normally. If the landing gear is sensed to be extended, the pilot is alerted to this situation. Similarly, if a landing on a runway is proposed, the pilot is alerted if the landing gear is not extended.

U.S. Pat. No. 6,008,742 provides for a transducer unit to sense ground presence. A signal is continuously radiated downward from the transducer. When the signal strikes a surface, a portion of the radiated energy is reflected back to the transducer. A receiving device reacts to this reflected signal. An electronic module analyzes the electronic signals produced by the transducer unit, and also determines if the aircraft landing gear is retracted or extended. When the electronic module determines that the aircraft is in close proximity to the ground, approximately 100 ft. to 200 ft, it then determines if the landing gear is retracted or extended. This is accomplished by monitoring the status of the landing gear down indicator light. If it is determined that the aircraft is close to the ground, and the landing gear is still retracted, it produces a warning to the pilot. The warnings continue until the pilot either extends the landing gear, or climbs the aircraft more than 200 ft. above ground level.

U.S. Pat. No. 5,745,053 provides for a landing gear warning system for aircraft. The landing gear warning system consists of a landing gear sensor for generating a signal representative of the position of the landing gear, an aircraft positioning system for generating a signal representative of the aircraft's latitude, longitude, and elevation, a pilot warning device, and a computer system coupled to the landing gear sensor, the aircraft positioning system, and the pilot warning device. The computer system has a database that contains the longitude and latitude, and elevation of a number of runways, receives a signal representative of the aircraft's latitude, longitude, and elevation, receives a signal representative of the position of the landing gear member, and generates a pilot warning signal if the aircraft's elevation is less than a predetermined value above the elevation of the closest runway in the database to the aircraft and the signal representative of the position of the landing gear indicates that the retractable landing gear is retracted.

It will be appreciated that the '124 patent requires the pilot to take action first checking the landing gear status upon a speed indication of a possible landing and second checking the type of surface the aircraft is landing on. Further, studies have shown that pilots will choose the incorrect landing gear configuration 2–3 times out of 1000. The chance of these occurrences is increased where there is water located near the runway and the pilot has indecision about which surface he/she wants to land upon. The '742 and '053 patents may serve to inform the pilot of the altitude of the aircraft and the status of the landing gear, however, these pilot warning systems do not inform the pilot whether the landing gear should be retracted or deployed depending on the surface on which the aircraft will be landing.

Therefore, it would be desirable to provide an improved landing gear system to prevent or reduce the incidence of pilot error associated with incorrect gear status landings, requiring no affirmative pilot input, and giving warnings or indications consistent with the landing scenario.

SUMMARY OF THE INVENTION

The present invention provides for an improved landing gear warning system to warn a pilot when landing gear of an aircraft are in the improper configuration for a landing on a particular surface. It may also affirmatively indicate that the gear is in the proper configuration for the assurance of the pilot. The warning system comprises a computer operatively connected to a surface monitor and a gear-status warning indicator. The computer accepts inputs from the surface monitor to determine whether the terrain below the aircraft is water or land. The computer also accepts an input from the gear status sensors to determine if the landing gear is extended or retracted. If the system senses a water surface and the landing gear is down, a warning light and/or buzzer preferably alerts the pilot that the landing gear is in the incorrect configuration. Conversely, if the landing surface is land and the gear is up, the "gear status" indicator warning is initiated.

Another aspect of the present invention provides for the pilot receiving constant altitude cues at a predetermined distance above water to indicate the altitude in situations where a amphibian pilot cannot easily determine an aircraft's height off the water due to glare off of glassy water.

Another aspect of the present invention provides for warning the pilot in an unsafe landing gear situation such as when one (or more) "gear up" or "gear down" indicators are not operating properly or the landing gear itself is not operating properly.

Another aspect of the present invention provides for accurately mapping the surface below an aircraft. A computer accepts inputs from a surface monitor to determine whether the terrain below the aircraft is water or land. The computer further accepts an input from a navigational device, such as a global positioning unit. The computer then maps what type of ground surface is located at the latitude and longitude supplied by the navigational device.

Another aspect of the present invention provides for a warning to a pilot who is dropping payloads from the plane the payloads being intended for either land or water. The warning system would alert the pilot if they were about to drop a payload into the other type of surface. For example, if a payload was to be dropped over land, the present invention may warn the operator that the aircraft is over water.

DETAILED DESCRIPTION OF THE INVENTION

Figure 1:
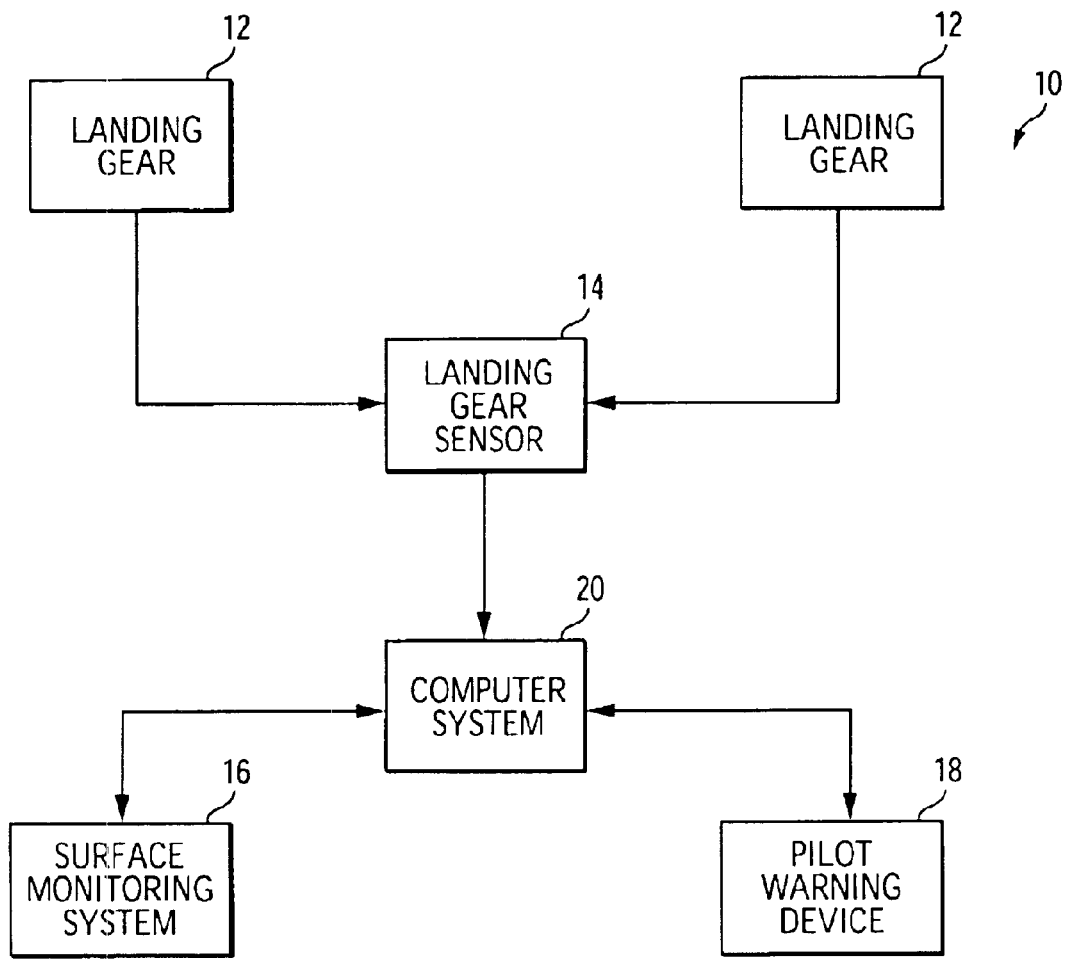
FIG. 1 is an architecture diagram of an improved landing gear warning system of the present invention.

To assist in an understanding of the invention, a preferred embodiment or embodiments will now be described in detail. Reference will be frequently taken to the figures, which are summarized above. Reference numerals will be used to indicate certain parts and locations in the figures. The same reference numerals will be used to indicate the same parts or locations throughout the figures unless otherwise indicated.

The present invention is not limited to only amphibians, and may be employed in many of various types of aircraft. It is to be further understood, moreover, the present invention may be employed with many of various types of altitude sensing or terrain identification devices and is not limited only to surface monitoring systems. For purposes of illustration only, however, the present invention is below described in the context of aircraft, particularly amphibians utilizing surface monitoring systems.

With reference to FIG. 1, a block diagram of an improved landing gear warning system of the present invention is shown. Landing system 10 is comprised of at least one retractable landing gear apparatus 12, a landing gear sensor 14 operatively coupled to retractable landing gear(s) 12, a surface monitor 16, a pilot warning device 18, and computer system 20 operatively connected to landing gear sensor 14, surface monitor 16, and pilot warning system 18.

Computer system 20 can be any type of computer system such as a personal computer, a microprocessor, or a PIC microcontroller. However, in a preferred embodiment computer system 20 is a single high-density integrated circuit containing a complete central processing unit, three kinds of memory (ROM, RAM, and EEPROM), an analog to digital converter, synchronous and asynchronous serial interfaces, an on board clock and pulse accumulator subsystem, and numerous input and output ports.

Surface monitor 16 can be any type of pilot awareness system providing altitude data, such as terrain awareness systems offered commercially by Honeywell® and Universal Avionics®, GPS receivers, sonar range finders, or a physical sensor. However, preferably the present invention uses a laser distance measuring system such as the AR4000 or the AR600 offered commercially by Acuity Research, Inc and or the terrain-sensing laser system designed and manufactured by Rosemount Aerospace Inc./BFGoodrich Aerospace, Aircraft Sensors Division of Burnsville, Minn. However, other energy transmission types for effecting the present invention could be continuous microwave signals, Doppler microwave signals, spectra of visible light, ultraviolet light, or infrared energy. Any sensing subsystem which is capable of determining the altitude of the aircraft is suitable for certain embodiments of the invention, although preferably the sensing subsystem also indicates the landing surface (e.g., ground or water).

Landing gear sensor 14 can be any type of landing gear sensor, which provides a signal indicating whether the landing gear is retracted or extended such as the MIL-S-25253-1 limit switch. However, preferably landing gear sensor 14 is a magnetic sensor, such as is commercially manufactured by Hamline.

Pilot warning device 18 can be any type of warning device such as a warning light and buzzer. This warning will preferably be both visual and audible. Further, the visual and/or audible warning may have an explanatory legend by a warning light, or have an audible "Betty" human or synthesized voice explanation. The pilot warning device 18 may present a visual warning and/or an acoustical warning. If a visual warning is desired, then any light emitting device such as a light bulb, a light emitting diode (LED), an electro-luminescent device, and/or a display on an aircraft-positioning device may be used. If an acoustical warning is desired, then any sound producing device such as a buzzer (e.g., piezoelectric or electromagnetic), a horn, a chime, or a conventional voice chip with a prerecorded message may be used. Further, if an acoustical warning device is used it preferably emits the warning sound both in the cockpit of the aircraft and through the pilots headsets. However, preferably pilot warning device 18 is a horn/buzzer commercially manufactured by Mallory.

Figure 2:
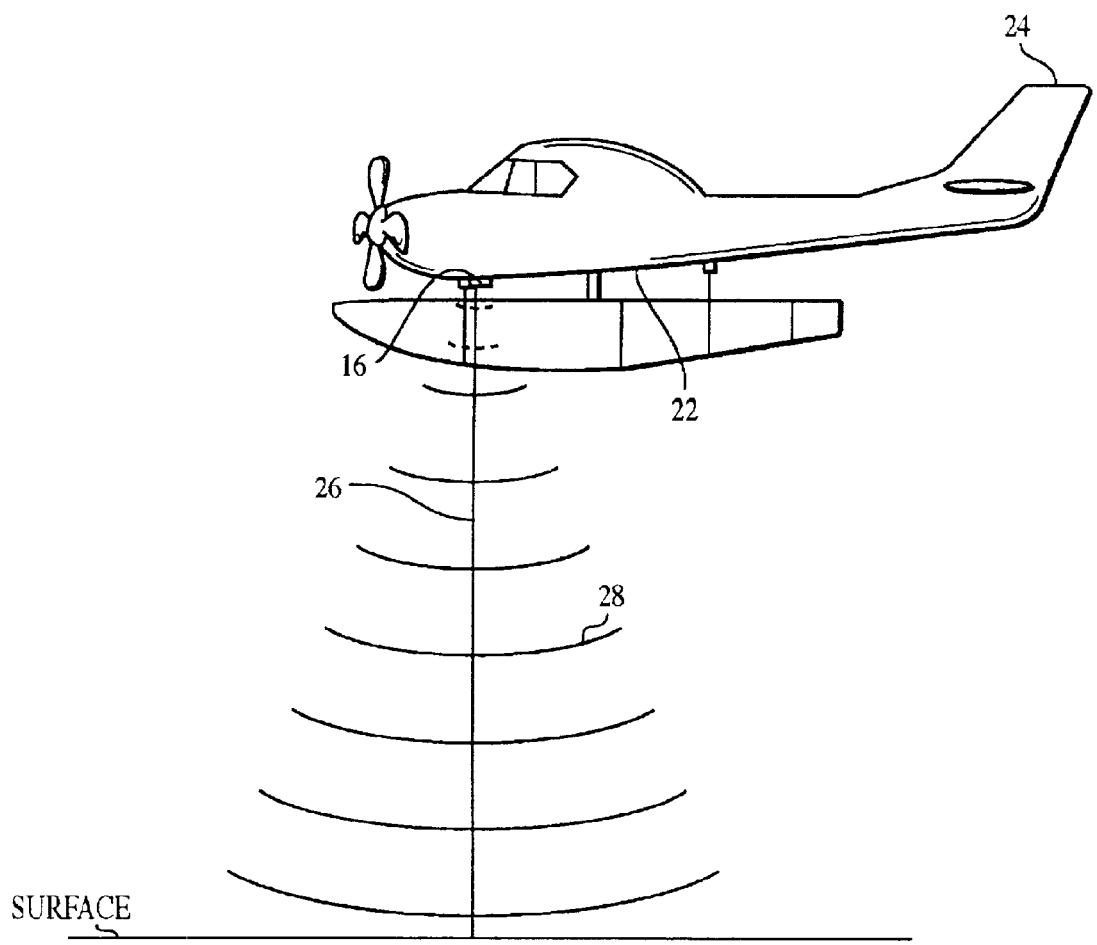
FIG. 2 is a plan view of an aircraft with floats for water landings and having a warning condition according to one implementation of the present invention.

In a preferred embodiment, computer system 20 is operatively coupled to surface monitor 16 and landing gear sensor 14 to warn a pilot if landing gear 12 is not in the proper configuration for a landing on a particular landing surface (i.e., ground or water). Preferably, computer system 20, surface monitor 16, and landing gear sensor 14 communicate through RS-232 or RS-422 communication ports, however, it is fully contemplated that any type of communication protocol compatible with other aircraft communication and navigation systems could be used including optical, infrared, and RF. With reference to FIG. 2, a profile view of an aircraft with floats for water landings is shown. Surface monitor 16 is preferably mounted on belly 22 of aircraft 24 and emits an electronic signal towards the surface below aircraft 24. It is contemplated, however, that surface monitor 16 could be mounted anywhere on aircraft 24 in order to provide a determination of the surface below aircraft 24.

As stated above, preferably surface monitor 16 is a laser distance measuring system such as the AR4000 or the AR600 offered commercially by Acuity Research, Inc. In a preferred embodiment surface monitor 16 is comprised of two laser distance-measuring systems. A first laser distance measuring system is used to emit a narrow laser beam 26, which provides a good return when reflected off of land. A second laser distance measuring system is used to emit a spread laser beam 28, which provides a good return when reflected off of water. In operation both the first and second laser distance measuring systems would emit laser beams 26 and 28 respectively, continuously. If both systems receive little to no return signals from the surface then computer system 20 interprets this response to mean that aircraft 24 is too high above the surface and is not preparing to land. If the first laser distance measuring system receives a return signal above a predetermined threshold and the second laser distance measuring system receives little to no return then computer system 20 interprets this response to mean that aircraft 24 is over land and that aircraft 24 is preparing to land. If the second laser distance measuring system receives a return signal above a predetermined threshold and the first laser distance measuring system receives little to no return then computer system 20 interprets this response to mean that aircraft 24 is over water and that aircraft 24 is preparing to land. In a preferred embodiment, the power supplied to the transmitters of both first and second laser distance-measuring systems is preset so that the distance measuring systems will not start receiving returns off the surface until an altitude indicating a landing is reached.

In another embodiment, computer system 20 receives a signal from surface monitor 16. Upon receiving a return signal, computer system 20 determines the amount of signal actually returned to surface monitor 16. Generally, a signal reflected off of water provides a reduced recognition return signal when compared to a signal reflected off of land. Therefore, if the returned signal is below a certain predetermined amount, then computer system 20 determines that the aircraft is above water. If the returned signal is above this predetermined threshold, then computer system 20 determines that the aircraft is above land. It is contemplated that other methods of differentiating between water and land could be used without departing from the spirit of the invention. Such methods include comparing the returned signal to actual returns from water and land stored in memory to determine the surface below the aircraft. Further, it is also contemplated that varying levels of a reduced recognition return signal could also indicate if the water is deep enough to provide a risk of the aircraft flipping if the landing gear was extended (e.g., a lake as opposed to surface puddles on a runway).

Figure 3:
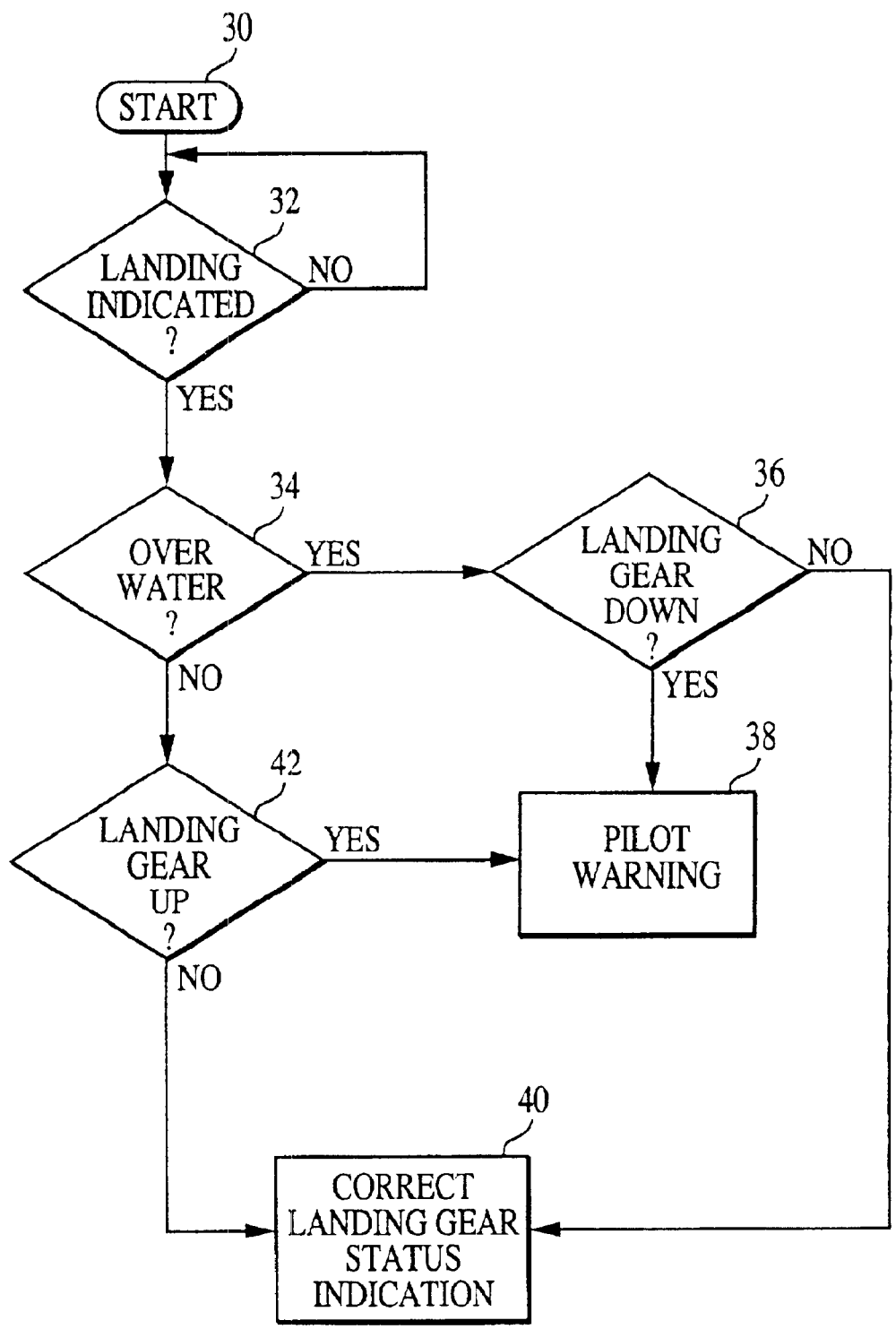
FIG. 3 is a flow chart diagram depicting the operation of one implementation of the present invention.

With reference to FIG. 3, a flow chart diagram depicting the operation of one implementation of the present invention is shown. When surface monitor 16 begins receiving a return signal from the surface, it interprets this signal into a distance above ground or altitude of the aircraft and determines the amplitude of the return signal. This information is then relayed to computer system 20, which signifies the start of operation for landing system 10 as represented as state 30 in FIG. 3. Upon receiving the altitude or distance above surface information from surface monitor 16, software on computer system 20 determines whether the plane is preparing for a landing as indicated by state 32. Preferably computer system 20 will determine that a landing is proceeding when aircraft 24 drops below 150–200 ft above the earth's surface. If computer system 20 determines that no landing is in progress, then computer system 20 returns to state 30 and the landing determination process begins again. If computer system 20 determines that a landing is in progress, then computer system 20 proceeds to state 34 where a determination is made based on the amplitude of the return signal as to whether aircraft 24 is above water or land. If system 20 of the present invention determines there is a water surface below the aircraft, then computer system 20 proceeds to state 36 to determine whether landing gear 12 is extended. If computer system 20 receives a signal from landing gear sensor 14 indicating that landing gear 12 is extended, computer system 20 proceeds to state 38 and activates pilot warning device 38 to alert the pilot landing gear 12 is in the incorrect configuration for the landing desired. However, If computer system 20 receives a signal from landing gear sensor 14 indicating that landing gear 12 is retracted, computer system 20 proceeds to state 40 and activates a correct landing gear status indication to notify the pilot landing gear 12 is in the correct configuration for the landing desired.

With reference again to state 34, if system 20 of the present invention determines there is land below the aircraft, then computer system 20 proceeds to state 42 to determine whether landing gear 12 is retracted. If computer system 20 receives a signal from landing gear sensor 14 indicating that landing gear 12 is retracted, computer system 20 proceeds to state 38 and activates pilot warning device 38 to alert the pilot landing gear 12 is in the incorrect configuration for the landing desired. However, If computer system 20 receives a signal from landing gear sensor 14 indicating that landing gear 12 is extended, computer system 20 proceeds to state 40 and activates a correct landing gear status indication to notify the pilot landing gear 12 is in the correct configuration for the landing desired.

It is contemplated that landing system 10 may advise the pilot of the status of landing gear 12 (retracted or extended) on every landing regardless of the landing surface. However, preferably, a warning system according to the present invention informs the pilot if the aircraft is landing on water or a hard surface and if the gear status is incorrect for a landing on this surface. As stated above, computer system 20 electronically differentiates between water or land based upon the signal returns from the first and second laser distance-measuring systems of surface monitor 16. Then at a preselected distance (or altitude) computer system 20 triggers a warning if landing gear 12 is in an inappropriate position for the type of surface the aircraft is above. This appropriate altitude can be programmed at the time of manufacture of the system, at the time of installation into the aircraft based on aircraft type, or selected by the pilot according to pilot preference. In a preferred embodiment, the system once installed could not be defeated, and a minimum warning altitude may be preprogrammed by the manufacturer and not changed by the pilot to be less than this minimum warning.

Another aspect of the present invention provides for altitude determination in the case of glassy water where a amphibian pilot cannot easily determine height off the water for proper flair. Surface monitor 16 would provide the altitude above the water such that it would give an audible indication of the height (say at five feet) or it could be connected to a readout giving continuous height information. The same feature may be used for landing minimums for IFR landings on land.

In another aspect of the present invention, the pilot may be advised or warned in case of an unsafe landing gear such as one (or more) of the "gear up" or "gear down" lights not coming on as required by the safe gear status determined by the system based on landing altitude and landing surface.

The present invention also admits of use by retractable gear airplanes that are not amphibians. The system would be identical in most respects to the preferred embodiment, but the feature by which the landing surface is determined (i.e., land or water) is ignored or disabled. The pilot could then be warned at a preset or preselected altitude if his gear is not down and to abort the landing, or as time permits, to lower the landing gear.

It will be appreciated that the present invention admits of use in any application in which an aircraft operator wishes to know or should be warned about the nature of the earth's surface under the aircraft. For example, in another aspect of the present invention provides a method for accurately mapping the surface below an aircraft. A computer accepts inputs from a surface monitor to determine whether the terrain below the aircraft is water or land. The computer further accepts an input from a navigational device, such as a global positioning unit. The computer then maps what type of ground surface is located at the latitude and longitude supplied by the navigational device.

In another aspect of the present invention provides for a warning to a pilot who is dropping payloads from the plane to the ground. Such payloads, for example, may be designed to be dropped over water or land. The warning system could be set to alert the pilot if they were about to drop a payload into a surface for which the payload was not designed.

It will be appreciated that the present invention can take many forms and embodiments. The true essence and spirit of this invention are defined in the appended claims, and it is not intended that the embodiment of the invention presented herein should limit the scope thereof.

What is claimed is:

1. An aircraft landing gear warning apparatus, comprising:
    (a) a surface monitoring device providing a signal corresponding to a surface type beneath an aircraft;
    (b) a gear status sensing device providing a signal representative of a status of the aircraft's landing gear; and
    (c) a computer system which receives said surface signal and said gear status signal said computer system comparing said surface signal with said gear status signal and providing a positional gear status signal.

2. The apparatus of claim 1, wherein the surface monitoring device is at least one laser distance-measuring device.

3. The apparatus of claim 2, wherein the surface monitoring device further provides a signal corresponding to the altitude of the aircraft.

4. The apparatus of claim 1, wherein the surface monitoring device is comprised of a transmitter, which transmits a signal to the surface and a receiver, which receives the signal after reflecting off the surface beneath the aircraft.

5. The apparatus of claim 4, wherein if the surface below the aircraft is water, the received signal has a reduced recognition greater than if the surface below the aircraft is a hard surface.

6. The apparatus of claim 1, further comprising gear status warning indicators, which receive said positional gear status signal if the aircraft's landing gear is not positioned properly based upon the surface type being landed upon.

7. The apparatus of claim 6, wherein said gear status warning indicators provide a visual warning.

8. The apparatus of claim 6, wherein said gear status warning indicators provide an audible warning.

9. The apparatus of claim 1, the computer initiates a warning signal if a gear status indication light is not working properly.

10. An aircraft landing gear warning apparatus, comprising:
    a surface detection means for providing a signal corresponding to a surface type beneath an aircraft;
    a gear status sensing means which provides a signal representative of a status of the aircraft's landing gear; and
    a computer system means which receives said surface signal and determines the surface type beneath the aircraft;
    wherein the computer system means receives said surface signal and said gear status signal, said computer means comparing said surface signal with said gear status signal and provides a positional status signal.

11. The apparatus of claim 10, further comprising a status indication means to alert a pilot of the surface type beneath the aircraft.

12. The apparatus of claim 10, wherein the surface monitoring means is comprised of a first laser distance-measuring device having a narrow beam width providing a good return off of land and a second laser distance-measuring device having a wide beam width providing a good return off of water.

13. The apparatus of claim 10, further comprising gear status warning indicators, which receive said positional gear status signal if the aircraft's landing gear is not positioned properly based upon the surface type being landed upon.

14. The apparatus of claim 10, wherein the surface detection means further provides a signal corresponding to the altitude of the aircraft.

15. The apparatus of claim 14, wherein the altitude signal provides an amphibian pilot with constant altitude information in situations where the amphibian pilot cannot determine an aircraft's height due to glare off of glassy water.

16. The apparatus of claim 10, further comprising a warning means providing a warning to a pilot dropping payloads from the aircraft to the earth's surface.

17. The apparatus of claim 16, wherein the warning means alerts the pilot if they were about to drop a payload onto a surface for which the payload was not designed.

18. The apparatus of claim 10, further comprising a mapping means for mapping the surface below an aircraft.

19. The apparatus of claim 18, wherein the computer system means receives navigational information from a navigation device.

20. The apparatus of claim 19, wherein the computer system means provides for mapping the ground surface below the aircraft at a latitude and longitude provided by the navigational device.

* * * * *